March 31, 1953     R. SMOLUCHOWSKI     2,633,017
METHOD OF DETECTING AN ELECTRICAL
TWINNING BOUNDARY IN CRYSTALS
Filed May 31, 1946
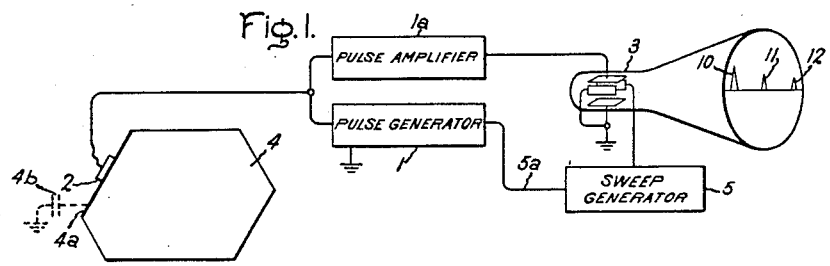
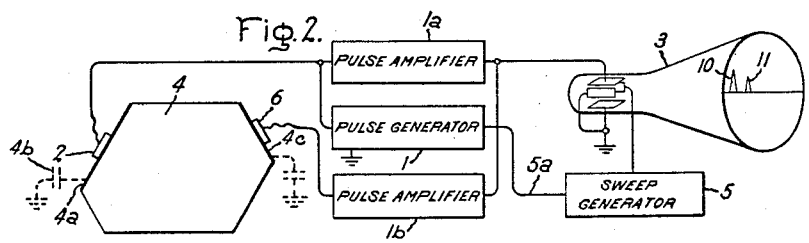
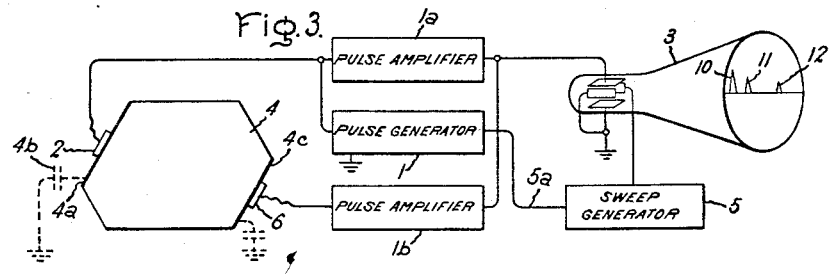
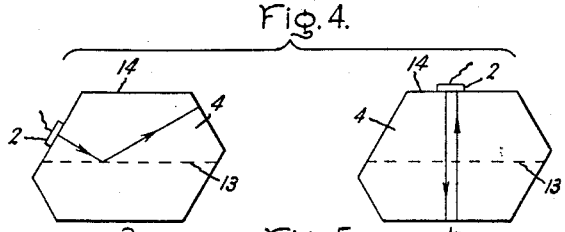
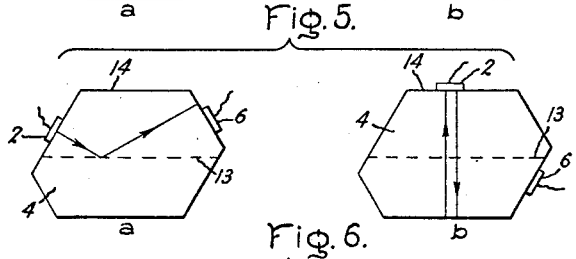
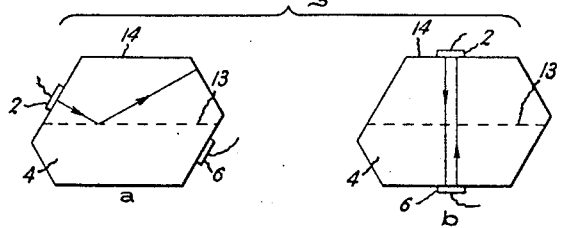
Inventor:
Roman Smoluchowski,
by Merton D Morse
His Attorney.

Patented Mar. 31, 1953

2,633,017

UNITED STATES PATENT OFFICE 2,633,017

METHOD OF DETECTING AN ELECTRICAL TWINNING BOUNDARY IN CRYSTALS

Roman Smoluchowski, Pittsburgh, Pa., assignor to General Electric Company, a corporation of New York Application May 31, 1946, Serial No. 673,420

4 Claims. (Cl. 73—67)

My invention relates to a method for detecting electrical discontinuities in piezoelectric crystals and particularly to a method for detecting discontinuities in crystal properties, such as electrical twinning.

Electrical twinning in crystals is a well-known property whereby two portions of a crystal on opposite sides of a boundary plane exhibit opposite electrical characteristics. Twinned crystals occur in forms known as "optical twins" and "electrical twins." In both forms, the electrical characteristics on opposite sides of the boundary plane are relatively reversed. In optical twins the characteristic may be easily detected by polarized light, because in such crystals the electrical discontinuity is accompanied by an optical discontinuity in that the twinned portions of the crystal rotate the plane of a beam of polarized light in opposite senses.

In electrical twinning, however, polarized light is ineffective for detecting the discontinuity. Methods are known for detecting electrical twinning, but usually these methods can be used only after considerable work has been done on the crystal. For example, electrical twinning may be determined by etching a surface of a cut crystal which is substantially perpendicular to the optical axis. This method, however, is wasteful of time and effort in that it requires at least partial finishing of crystals which are later found to be defective.

Accordingly, it is a general object of my invention to provide a new and improved method for detecting electrical discontinuity in piezoelectric crystals.

It is a further object of my invention to provide a new and improved method for detecting electrical twinning in piezoelectric crystals.

It is a still further object of my invention to provide a testing method applicable to uncut or natural piezoelectric crystals to detect electrical twinning in such crystals.

A number of crystal elements having piezoelectric properties are well-known to those skilled in the art; for example, quartz, Tourmaline, and Rochelle salt crystals exhibit such properties. Some of these crystals, and particularly quartz crystals as they occur in nature, commonly take the form of hexagonal prisms, the major faces of the prisms being perpendicular to the electric axis of the crystal and parallel to the optical axis. It has been found that where twinning occurs in such a crystal the boundary plane between the twinned portions of the crystal is usually parallel to one of the major faces. In some cases, a crystal may exhibit intersecting boundary planes, each parallel to a major face.

I have discovered that this boundary plane possesses the property of reflecting, at least in part, a beam of wave motion directed obliquely against it. More particularly, a beam of ultrasonic wave motion directed obliquely against the boundary plane between twinned portions of a piezoelectric crystal will be partially reflected and partially transmitted. A beam of wave motion directed perpendicular to the boundary plane will experience very little reflection upon encountering the plane. I utilize this characteristic of partial reflection to determine the presence of an internal reflecting boundary within the crystal, and more particularly to detect electrical twinning in crystals without necessitating cutting or further finishing the crystal. For this purpose, I successively direct beams of ultrasonic wave motion into the crystal in directions substantially perpendicular to the major faces, and measure the relative reflection or relative transmission of the beams within the crystal.

My invention will be more fully understood and its various objects and advantages further appreciated by referring now to the following detailed specification taken in conjunction with the accompanying drawing in which Figs. 1, 2, and 3 are schematic circuit diagrams of apparatus illustrating various embodiments of my invention, and Figs. 4, 5, and 6 are schematic diagrams of a twinned crystal illustrating the reflecting characteristics of the boundary plane between the twinned portions.

Referring now to Fig. 1, I have illustrated in block diagram one form of apparatus for detecting electrical twinning in a crystalline element. The apparatus comprises a pulse generator 1 connected to supply recurrent pulses of high frequency electric oscillations to a small piezoelectric crystal 2 and through a pulse amplifier 1a to an oscilloscope 3. The crystal 2 may suitably be either quartz, Rochelle salt, or other crystalline element possessing piezoelectric characteristics. To facilitate application of the pulsed oscillations from the generator 1 to the crystal opposite major faces of the crystal plate 2 are coated with electric conducting films serving as electrodes. The crystal 2 is placed in good wave transmitting contact with a major face of a crystal 4 being tested. In this connection, I have also found it advisable to coat the various surfaces of the crystal 4 to which the crystal 2 is applied with a layer of electric conducting material 4a. While I am not entirely certain of the function of this electric conducting coating, I believe that it serves as a ground for the low potential electrode surface of the transmitting and receiving crystal 2. For the purpose of illustration, I have indicated in broken lines a large capacitance 4b between the coating 4a and ground.

The crystal 2 serves both to transmit wave motion to and to receive wave motion from the crystal 4. The high potential lead from the crystal 2 supplies the reflected impulses through the pulse amplifier 1a to the oscilloscope 3. A suitable sweep voltage is supplied to the oscilloscope 3 from a sweep generator 5. The sweep generator 5 is synchronized, as through a lead 5a, with the pulse generator 1.

In operation, I prefer to supply to the transmitting crystal 2 short impulses of high frequency electric oscillations at a relatively low repetition rate; for example, impulses of 5 to 10 microsecond duration occurring at a repetition rate of 60 per second have been found suitable, with the frequency of the pulsed oscillations being of the order of 1 to 5 megacycles per second.

It will be understood that the electric impulses applied to the transmitting crystal 2 at ultrasonic frequency set up in the crystal 2 a wave motion at like frequency. Such ultra-sonic wave motion of the crystal 2 is directed into crystal 4 as a beam of wave motion. Any reflected beam of wave motion impinging upon the crystal 2 sets up electric oscillations along the electric axis of the crystal, and these oscillations are amplified in the amplifier 1a and impressed upon the oscilloscope 3.

At Fig. 2, I have illustrated another embodiment of my invention wherein the pulse generator 1 supplies electric oscillations to a transmitting crystal 2 and through an amplifier 1a to the oscilloscope 3, while reflected oscillations are detected upon a separate receiving crystal 6 and supplied through another pulse amplifier 1b to the oscilloscope 3. Like reference numerals have been assigned to like parts in Figs. 1 and 2. In the embodiment of the invention shown at Fig. 2 the receiving crystal 6 is located upon a major face of the crystal 4 being tested which is adjacent that face opposite the transmitting crystal 2. The crystal 6, like the crystal 2, has a conducting coating on opposite major faces, and both crystal contact surfaces of the crystal 4 are coated with conducting material 4a, 4c. With the transmitting crystal 2 positioned to direct a beam upon the opposite face of the crystal 4, the receiving crystal 6 will not receive the direct beam from the crystal 2, but will receive a reflected beam only, in the event that a twinning boundary exists parallel to the surface intermediate the transmitting and receiving crystals.

At Fig. 3, I have illustrated schematically a still further embodiment to my invention similar to that of Fig. 2, but in which the receiving crystal 6 is positioned upon the major face of the crystal 4 directly opposite the transmitting crystal 2. In Figs. 2 and 3 like parts have been assigned like reference numerals. In the arrangement of Fig. 3, the crystal 6 receives only transmitted wave motion, so that if a twinning boundary oblique to the direction of wave propagation exists, the amount of transmitted energy received by the crystal 6 will be considerably reduced with respect to that received through a homogeneous crystal.

By way of comparison, I have illustrated in conjunction with Figs. 1, 2, and 3 typical oscilloscope patterns which will be received under certain circumstances. For example, referring to Fig. 1, the transmitted pulse is indicated as a pip 10 on the oscilloscope 3. A reflected pip 11 appears after a time interval sufficient for the ultrasonic wave to travel through the crystal 4 to the opposite face and reflect back from the opposite face to the transmitting and receiving crystal 2. The pip 12, appearing a like time interval after the pip 11 at Fig. 1, indicates a second-order reflection. The oscilloscope pattern at Fig. 1 has been drawn assuming a homogeneous crystal. It has been found that when ultra-sonic wave motion is transmitted substantially perpendicular to a twinning boundary, the amount of energy reflected at the boundary is very small. This reflection is sometimes observable as a very small pip situated between pips 10 and 11.

At Fig. 2, the pip 10 represents the transmitted pulse. It will be understood that if the crystal 4 at Fig. 2 were homogeneous and the beam from crystal 2 directed at the opposite face of the crystal 4, no reflected impulses would impinge upon the receiving crystal 6. If, however, the crystal 4 possesses a boundary plane of electrical discontinuity parallel to the face intermediate the crystals 2 and 6, a reflected impulse 11 will appear upon the oscilloscope after a time interval necessary for the ultra-sonic wave to travel through the crystal 4 from the transmitting crystal 2 to the reflecting boundary and from the reflecting boundary to the crystal 6. It will be understood also that a small portion of the ultra-sonic beam is not reflected, but is transmitted through the plane of discontinuity to the face opposite the crystal 2 and reflected from this face back toward the crystal 2. This may cause second and higher order reflected pulses observed after pip 11.

The oscilloscope pattern at Fig. 3 has been drawn for a homogeneous crystal. In such a case, the pip 10 on the oscilloscope represents the transmitted impulse and the pip 11 represents the received pulse, these pulses being spaced apart by the time required for a single transmission through the crystal 4 from the transmitting crystal 2 to the receiving crystal 6. The received beam is in part reflected back toward the transmitting surface and again reflected from the transmitting surface to the receiving surface. A pip 12 on the oscilloscope indicates such a second order transmission.

My method for utilizing the ultra-sonic reflecting characteristic of a plane of electrical discontinuity in a piezoelectric crystal will be more fully understood by referring now to Figs. 4, 5, and 6. At Fig. 4, I have illustrated a method for determining the existence of a reflecting plane by utilizing a combined transmitting and receiving crystal 2 as shown at Fig. 1. At Fig. 4, the crystal 4 being tested is assumed to exhibit electrical twinning on opposite sides of an internal boundary plane 13 parallel to a surface 14. In operation, the transmitting and receiving crystal 2 is first placed against any selected major surface of the crystal. If it be assumed, as at Fig. 4a, that this first surface is adjacent the surface 14, it is evident that a considerable portion of the ultra-sonic wave directed into the crystal will be reflected from the internal surface of discontinuity 13, so that only a small amount of wave energy will be transmitted completely through the crystal and reflected back for reception upon the crystal 2. That part of the energy which was reflected from boundary 13 may be reflected from the surface adjacent to 14 and returned along its original path. This intensity is very low due to three-fold reflection. If, now, the crystal 2 is placed against the face 14 of the crystal 4, as at Fig. 4b, ultra-sonic wave motion is directed in a direction perpendicular to the boundary of discontinuity 13. As previously pointed out, the boundary 13 is much more transparent for wave motion impinging perpendicularly thereon than for oblique incidence, so that the reflected impulse received upon the crystal 2 is considerably greater at Fig. 4b than at Fig. 4a. Such a difference in the reflecting properties of adjacent faces of the crystal 4 is indicative of an internal reflecting boundary characteristic of an electrically twinned crystal.

At Fig. 5, I have illustrated a method of testing utilizing the apparatus shown at Fig. 2. As at Fig. 4, I have assumed a crystal 4 being tested to have a boundary plane of discontinuity 13 parallel to the major face 14. At Fig. 5a, the transmitting crystal 2 and receiving crystal 6 are located upon the two faces adjacent the face 14. If the boundary plane 13 exists as assumed, an appreciable amount of wave energy will be received by reflection at the crystal 6. If, now, the crystals 2 and 6 are moved around the crystal 4, so that the transmitting crystal 2 is in contact with the major face 14 and the receiving crystal 6 in contact with a face adjacent that face opposite the face 14, the ultra-sonic wave is directed substantially perpendicular to the boundary plane 13. In this case, no appreciable indication is obtained upon the receiving crystal 6. This difference in the relative reflecting properties as the ultra-sonic wave is directed perpendicular to various faces of the crystal 4 is indicative of an internal reflecting surface.

At Fig. 6, I have illustrated a method of twinning detection utilizing the apparatus of Fig. 3, wherein relative transmission rather than relative reflection is measured. At Fig. 6, it has been assumed that the crystal 4 is the same as the crystal 4 illustrated at Figs. 4 and 5, in that an internal reflecting plane 13 is parallel to the major face 14. At Fig. 6, the transmitting crystal 2 and the receiving crystal 6 are positioned upon opposite faces of the crystal. If, as shown at Fig. 6a, the transmitting crystal 2 is positioned on a face adjacent the face 14 so that the plane 13 is oblique to the direction of wave propagation, a considerable portion of the ultra-sonic wave will be reflected at the plane 13 and only a small portion of the wave will be transmitted through the plane 13 to the receiving crystal 6. If, now, the crystals 2 and 6 are moved around the crystal 4, so that the transmitting crystal 2 is in contact with the face 14, as at Fig. 6b, a considerably larger indication will be received at the receiving crystal 6 because the plane 13, being now perpendicular to the direction of wave propagation, will reflect very little of the wave energy.

In connection with all the foregoing methods, it should be noted that air is a very poor conducting medium for ultra-sonic wave motion, and that even a very thin layer of air between the transmitting and receiving crystals and the face of the crystal being tested is sufficient to almost preclude the propagation of any appreciable amount of energy into the crystal 4. For this reason, I have found it advisable to coat with oil the various surfaces of the crystal 4 to which the transmitting and receiving crystals, 2 and 6, are applied.

While I have shown and described only certain preferred embodiments of my invention by way of illustration, many modifications will occur to those skilled in the art, and I, therefore, wish to have it understood that I intend in the appended claims to cover all such modifications which fall within the true spirit and scope of my invention.

What I claim as new and desire to secure by Letters Patent of the United States is:

1. The method of detecting the presence of an electrical twinning boundary in a particular plane in a piezoelectric crystal being in the shape of a prism, which comprises directing a beam of ultrasonic wave motion successively into and perpendicularly to two adjacent major faces of said crystal and toward said plane, one of said faces being substantially parallel to said plane, and receiving and measuring the intensity of said successive beams impinging on said plane from said adjacent faces at points on said crystal remote from said plane, whereby the degree of transmission for both directions of transmission into said crystal can be compared and said twinning boundary detected.

2. The method of detecting the presence of an electrical twinning boundary in a particular plane in a piezoelectric crystal being in the shape of a prism, which comprises directing a beam of ultrasonic wave motion successively into and perpendicularly to two adjacent major faces of said crystal and toward said plane, one of said faces being substantially parallel to said plane, receiving at each of said faces internal reflections from said crystal and measuring the intensity of said received reflections of said successive beams impinging on said plane from said adjacent faces, whereby the degree of reflection for both directions of transmission into said crystal can be compared and said twinning boundary detected.

3. The method of detecting the presence of an electrical twinning boundary in a particular plane in a piezoelectric crystal being in the shape of a prism, which comprises directing a beam of ultrasonic wave motion successively into and perpendicularly to two adjacent major faces of said crystal and toward said plane, one of said faces being substantially parallel to said plane, receiving at respective adjacent faces transmissions through said crystal, and measuring the intensity of said successive beams impinging on said plane from said adjacent faces, whereby the degree of transmission for both directions of transmission into said crystal can be compared and said twinning boundary detected.

4. The method of detecting the presence of an electrical twinning boundary in a particular plane in a piezoelectric crystal being in the shape of a prism, which comprises directing a beam of ultrasonic wave motion successively into and perpendicularly to two adjacent major faces of said crystal and toward said plane, one of said faces being substantially parallel to said plane, receiving at respective opposite faces parallel to said adjacent faces transmissions through said crystal, and measuring the intensity of said successive beams transmitted through said plane from said adjacent faces, whereby the degree of transmission for both directions of transmission into said crystal can be compared and said twinning boundary detected.

ROMAN SMOLUCHOWSKI.

(References on following page)

REFERENCES CITED

The following references are of record in the file of this patent:

UNITED STATES PATENTS

| Number | Name | Date |
|---|---|---|
| 1,866,454 | Dawson | July 5, 1932 |
| 2,151,736 | Broughton | Mar. 28, 1939 |
| 2,280,226 | Firestone | Apr. 21, 1942 |
| 2,401,382 | Willard | June 4, 1946 |
| 2,423,357 | Watrobski | July 1, 1947 |
| 2,461,543 | Gunn | Feb. 15, 1949 |

OTHER REFERENCES

Journal of Optical Society of America and Review of Scientific Instruments. Vol. VI, pages 183–185. March 1922.